Patented May 18, 1954

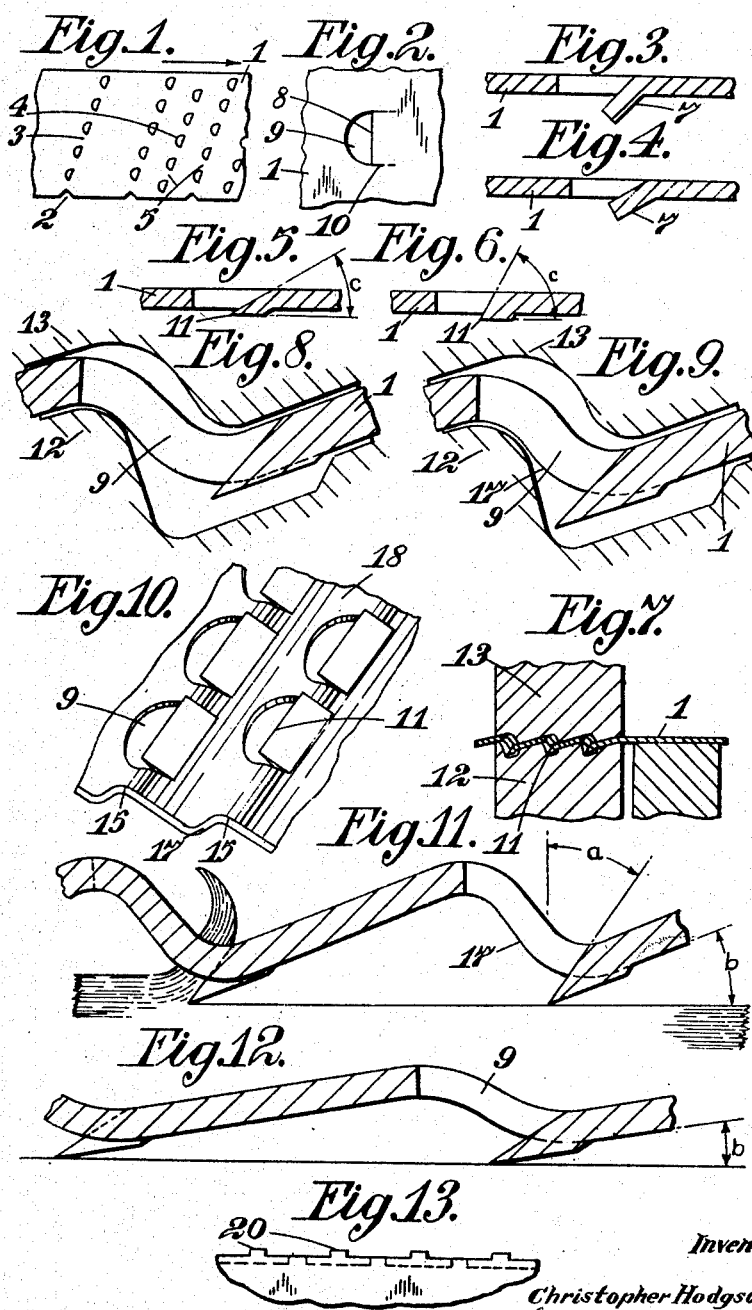

2,678,571

UNITED STATES PATENT OFFICE 2,678,571

METHOD OF MAKING CUTTING TOOLS

Christopher Hodgson Booth, Sheffield, England, assignor to Firth-Brown Tools Limited, Sheffield, England, a British company Application May 2, 1952, Serial No. 285,672

Claims priority, application Great Britain May 3, 1951

4 Claims. (Cl. 76—101)

The invention relates to cutting elements to be used as files, rasps, cutting bands, discs drums or like cutting and abrading tools and having a large number of cutting edges upstanding from the face of the tool and consisting of a thin flexible strip or sheet of steel or iron alloy susceptible to hardening having a multiplicity of holes formed therein and sharp cutting edges upset from the strip or sheet of which each is constituted by a portion of the edge of a hole, each has a clearance angle relative to the general plane of the surface of the strip or sheet and each has its cutting edges hardened. Cutting elements of this form (which are hereinafter referred to as cutting elements of the form described) are described and claimed in United States Patent Application Serial No. 126,032.

In United States Patent Application Serial No. 126,032 there is also described and claimed a method for the manufacture of cutting elements of the above form and the present invention consists in a modification or improvement in that method and in the cutting elements resulting from the new or improved method.

The invention provides the method of producing the cutting edges on a cutting element of the form described above, which method comprises the steps of upsetting from the surface of a sheet or strip blank parallel rows of spaced tongues, each tongue being divided from the material of the body of the blank at its side edges by slits extending to or towards the root of the tongue and each tongue sloping upwardly from the surface of the blank at an acuate angle to an extent such that the free end of the tongue is upset from the surface by an amount at least equal to the thickness of the material; removing (e. g. by grinding down) the upset free ends of the tongues parallel to the surface of the blank thereby to form sharp edges at the ends of the tongues at the peripheries of holes in the material; bending the blank in one direction along the lines of the roots of the tongues or along lines within the lengths of the tongues (without bending or substantially bending the tongues) with the sharpened edges on the convex side of the bend and reversely bending in the other direction along lines between the rows of tongues to form the blank into a series of ridges (e. g. shaped like saw teeth) of which the apices lie along the lines at, or adjacent to, the lines of the free ends of the tongues and each of which ridges has one side sloping upwardly to its apex with the tongues continuing the slope above the apex to present the cutting edges above the plane of the ridges, the angle which this side and the tongues make to the general plane of the blank being a suitable clearance angle for the edges; and hardening the cutting edges (preferably after the aforesaid bending operation).

It is preferred in carrying out the present invention to form the cutting edges, first to punch D-shaped holes in the strip or sheet.

It is also preferred first to upset the tongues to an extent greater than is required for the formation of the cutting edges, for the purpose of freeing the side edges of the tongues, and then to press the tongues back to the correct height.

The invention includes cutting elements comprising a sheet or strip having parallel rows of holes, which may be of D-shape, each hole having one side sharpened and hardened, the sheet or strip being reversely bent along lines parallel to the rows of holes into a succession of ridges with the sharpened edges extending from the ridges above the general plane formed by the ridges and at a suitable angle for cutting, to the said plane.

A specific example of the method according to the invention and of a cutting element produced according to the method, will now be described with reference to the drawings in which:

Figure 1 illustrates diagrammatically the first stage in the production of the element, Figure 2 is a view showing one of the holes punched in the strip, Figure 3 is a section through a portion of the strip showing one of the tongues bent too far down, Figure 4 is a view corresponding to Figure 3 showing the tongue bent back to the proper position, Figure 5 shows how the sharpened edge is produced by removing a portion of the tongue, Figure 6 shows, exaggerated, how the included angle of the cutting edges may be varied, Figure 7 shows the strip being bent to ridge form between dies, Figures 8 and 9 show how the extent to which the cutting edge extends above the apex of the ridge may be modified, Figure 10 is a perspective view of a part of the finished element, Figures 11 and 12 show how the rake and clearance angles of the cutting edges may be varied and also the clearance of the chip and Figure 13 shows a section through the work during cutting.

In this example a strip 1 of mild steel is first fed through a punching machine which cuts V- notches 2 along one edge of the strip at intervals corresponding to twice the pitch of the rows of cutting edges to be formed and simultaneously with the punching of each notch punches two rows 3, 4 of D-shaped holes separated by three times the space between the rows 5 finally to be produced. The notches are employed to index the movements of the strip and between each punching operation the strip is advanced by the interval between a pair of notches so that as the operation proceeds all the rows of holes are successively punched at the correct pitch. Using the same index notches the strip is next advanced through a machine which upsets from the plane of the strip short tongues 7 of which the free ends are constituted by the straight sides 8 of the D-shaped holes 9. The side edges 10 of the tongues are sheared from the body of the strip and the free ends of the tongues are as shown in Figure 3, upset by an amount substantially greater than the thickness of the material of the sheet thereby ensuring that the sides of the tongues are freed from the body of the sheet. The strip is next passed through a pair of rolls or blocks which press the tongues back towards the sheet to an extent such that they are then upset by only a little more than the thickness of the material (see Figure 4). Figures 5 and 6 illustrate how, by varying the angle which the tongue makes with the surface of the strip the included angle "C" of cutting edge may be varied. Most of each upset portion is then removed by grinding so as to form, for each hole, a sharp edge 11 lying just above the plane of the strip.

The strip is then fed through a press having co-operating dies 12, 13 of saw-toothed form. The strip is indexed through this machine using the same notches and the dies are positioned to bend the strip along lines at or near the free ends of the tongues but without bending the tongues themselves so that the sharpened edges are left projecting from the general plane of the strip.

Figures 8 and 9 show how by varying the precise position at which the bend is formed the extent to which the edges protrude below the ridge and hence the maximum depth of cut which the tooth can take, may be varied. The variation may be effected by varying the relative positions of the strip and the dies. A reverse bend is formed between each row of cutting edges. The bent strip accordingly has (see Figure 10) a succession of transverse ridges 15, a series of sharp edges 11 projecting upwardly from the apex of each ridge, and beneath each edge a hole 9 which is partly in the downwardly sloping side 17 of the ridge and partly in the upwardly sloping side 18 of the next ridge.

After locating the strip for bending as just described the edge carrying the index notches is removed, the strip is surface-hardened by a cyanide treatment followed by quenching, is dried and sand-blasted to remove flash from the sharpened edges. The strip is then dipped in a preservative and assembled on a backing plate (e. g. the strip may have lugs welded to it and these lugs used to secure the strip to a backing plate).

Figures 11 and 12 show how, by varying the sharpness of the bends in the strip varying rake and clearance angles may be given to the edges. In Figure 11 the rake angle $a$ is small and the clearance angle $b$ is large. In Figure 12 the reverse is the case. This variation is effected by using dies of different form.

It is preferred in carrying out the above example that the rows of tongues and perforations make an oblique angle (say 75°) to the edge of the strip so as to provide a shear cutting angle and to stagger the positions of the cutting edges in the alternate rows so as to provide cutting edges over the whole width of the strip. Figure 13 is a section through the work after the passage of one row of cutting edges and shows the ribs 20 left by the gaps between the edges. The figure also shows in dash lines the form of the work after the passage of the next row of edges.

In the elements described above the maximum depth of cut is determined by the extent to which the cutting edge 11 is upset from the convex surface of the apex of the ridge 15 from which the edge extends. This convex surface is constituted by the spaced narrow portions of the strip remaining between adjacent cutting edges.

In the elements described above the force required to overcome the cutting loads on the edges is transmitted through the arches formed by the portions of the ridges remaining between adjacent edges and holes. It is therefore important that these arches be of sufficient width and strength for this purpose.

It is to be understood that the invention is not restricted to the details set forth in the above example. For instance, other methods of hardening may be employed. Thus alloying ingredients to produce qualities of red hardness and non-corrosion such as tungsten cobalt, or molybdenum and chromium may be introduced into the surface of the strip by gaseous-diffusion to produce a hard or hardenable skin. Again the material may be hardened throughout and tempered at the ridges to provide flexibility. Further it is not essential that the finished elements are of flat form. They may, for example, be bent to convex form providing the equivalent of a half-round file. In this form the ridges will be of helical configuration and may be formed by male and female helical dies, or may be pressed into the desired form after the setting process. Again cutting edges may be formed on both sides of the material, for example at opposite sides of rectangular holes and the opposite edges be at the apices of the reverse bends respectively.

I claim:

1. The method of producing the cutting edges on a cutting element of the form described, which method comprises the steps of upsetting from the surface of a metal blank parallel rows of spaced tongues, each tongue being divided from the material of the body of the blank at its side edges by slits through the blank and each tongue sloping upwardly from the surface of the blank at an acute angle to an extent such that the free end of the tongue is upset from the surface by an amount at least equal to the thickness of the material of the blank, removing the upset free ends of the tongues parallel to the surface of the blank thereby to form sharp edges at the ends of the tongues at the peripheries of holes in the material, bending the blank in one direction along lines parallel to the rows and within the lengths of the tongues (without substantially bending the tongues) with the sharpened edges on the convex side of the bends and reversely bending the blank in the other direction along lines between the rows of tongues to form the blank into a series of ridges of which the apices lie along lines adjacent to the lines of the free ends of the tongues and each of which ridges has one side sloping upwardly to its apex with the tongues continuing the slope above the apex to present the cutting edges above the plane of the ridges, the angle which this side and the tongues make to the general plane of the blank being a suitable clearance angle for the edges, and hardening the cutting edges.

2. The method according to claim 1 in which the edges are hardened after the bending operation.

3. The method according to claim 1 in which, to form the cutting edges, D-shaped holes are first punched in the blank and the tongues are formed by the straight sides of the holes.

4. The method according to claim 1 in which the tongues are first upset to an extent greater than is required for the formation of the cutting edges and are then pressed back to the required height.

References Cited in the file of this patent

UNITED STATES PATENTS

| Number | Name | Date |
|---|---|---|
| 1,053,639 | Parkes | Feb. 18, 1913 |
| 1,109,156 | Wakfer | Sept. 1, 1914 |
| 1,884,185 | Peiseler | Oct. 25, 1932 |
| 2,182,067 | Bruecker | Dec. 5, 1939 |

FOREIGN PATENTS

| Number | Country | Date |
|---|---|---|
| 19,840 | France | June 1, 1915 |
| | (Addition to No. 417,473) | June 25, 1910 |
| 128,378 | Switzerland | Dec. 1, 1928 |
| 666,573 | Great Britain | Feb. 13, 1952 |
| 666,622 | Great Britain | Feb. 13, 1952 |
| 697,773 | France | Nov. 5, 1930 |